E. L. KLOSS.
FIELD STONE COLLECTOR.
APPLICATION FILED JUNE 23, 1910.
976,811.
Patented Nov. 22, 1910.
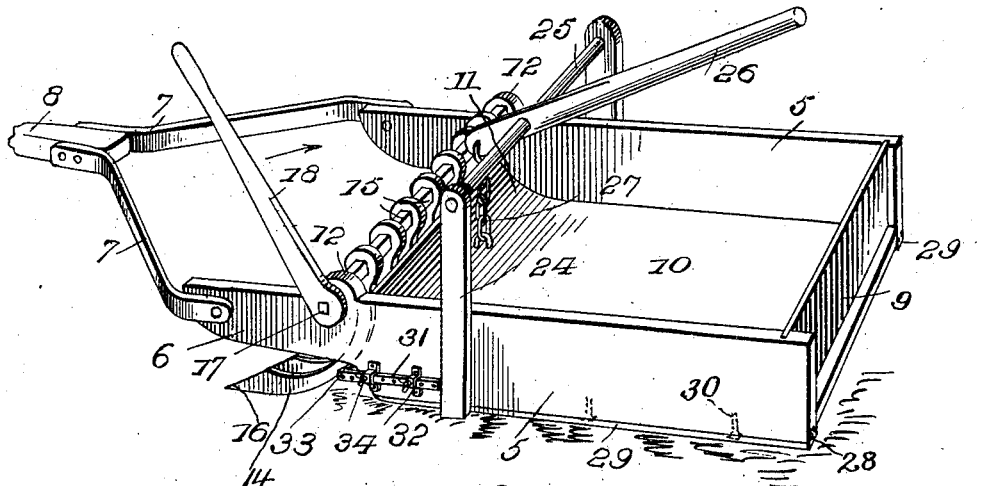
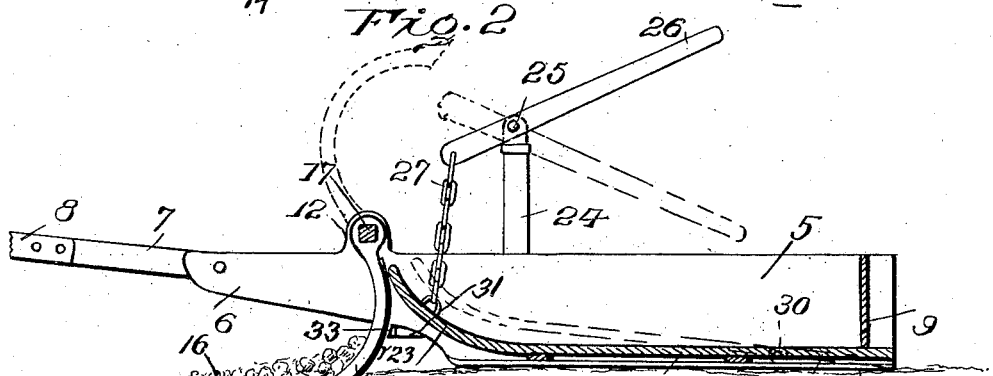
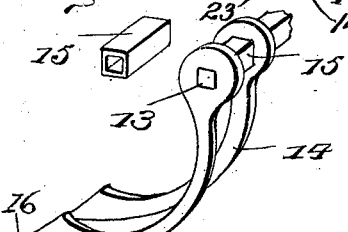
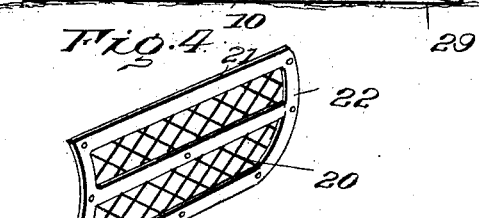
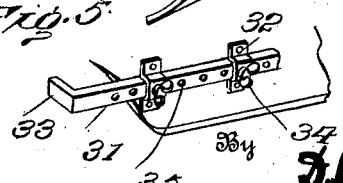
Witnesses
Inventor
Ernst L. Kloss
By
Attorneys

UNITED STATES PATENT OFFICE.

ERNST LUDWIG KLOSS, OF MINISINK FORD, NEW YORK.

FIELD-STONE COLLECTOR.

976,811.  Specification of Letters Patent.  Patented Nov. 22, 1910.

Application filed June 23, 1910. Serial No. 568,567.

*To all whom it may concern:*

Be it known that I, ERNST L. KLOSS, citizen of the United States, residing at Minisink Ford, in the county of Sullivan and State of New York, have invented certain new and useful Improvements in Field-Stone Collectors, of which the following is a specification.

This invention relates to stone gatherers and has for its object the provision of a strong, durable and thoroughly efficient device of this character for collecting and removing stones and other foreign bodies from the surface of a field after the soil has been plowed, harrowed or otherwise tilled.

A further object is to provide a stone gatherer including a receptacle having a movable bottom and provided at its forward end with a gathering device, means being provided for transferring the load from the gathering device to the receptacle.

A further object is to provide means independent of the gathering device for tilting the movable bottom of the receptacle, thereby to effect the dumping of the load.

A further object is to provide a removable screen for the teeth or tines when collecting relatively small stones, twigs and the like.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a stone gatherer constructed in accordance with my invention; Fig. 2 is a longitudinal section of the same, showing in dotted lines, the gathering device and movable bottom in dumping position; Fig. 3 is a detail perspective view of some of the teeth constituting the gathering device, one of the spacing members shown in connection therewith; Fig. 4 is a perspective view of the movable screen detached. Fig. 5 is a detail perspective view of the tooth regulator detached.

Corresponding and like parts are referred to in the following description and indicated in all the views of the drawings by the same reference characters.

The improved stone gatherer forming the subject matter of the present invention comprises a receptacle including spaced runners 5 having their forward ends reduced at 6 and pivotally connected through the medium of links 7 with a draft tongue 8. The rear end of the receptacle is open, while the runners 5 are provided with vertically disposed grooves for the reception of a removable end gate 9.

Disposed within the receptacle is a movable bottom 10, the front portion of which terminates short of the forward ends of the runners 5 and is curved upwardly, as indicated at 11. Disposed at the rear of the tongue and journaled in suitable bearings 12 secured to the upper longitudinal edges of the runners 5, is a transverse shaft 13, preferably angular in cross section and on which are mounted a plurality of depending teeth or tines 14, the latter being spaced apart by tubular members or blocks 15. The teeth or tines 14 are curved laterally in the direction of the tongue 8 and are provided with pointed terminals 16 adapted to enter the ground and thus collect stones, twigs and other foreign matter as the device is drawn over the surface of a field.

One end of the shaft 13 is provided with a square terminal 17, to which is rigidly secured an operating handle 18 so that by moving the free end of the lever in the direction of the arrow indicated in Fig. 1 of the drawings, the stones deposited on the gathering device may be transferred to the receptacle.

Secured to the rear faces of the teeth or tines 14 is a removable frame 19 covered by woven mesh wire or other foraminous material 20, said frame being secured to the gathering device when collecting relatively small stones, twigs or the like. The frame 19 is preferably curved to conform to the curvature of the teeth 14 and is reinforced and strengthened by the provision of intersecting longitudinal and transverse bars 21 and 22, said frame being detachably secured to the teeth by bolts or similar fastening devices 23.

Secured to one or both of the runners 5, is an upright 24, to the upper end of which is pivotally mounted at 25, a lever 26. The short end of the lever 26 is connected through the medium of a chain 27 with the upwardly curved end 11 of the movable bottom 10 so that by pressing downwardly on the long end of the lever 26, the front end of the member 10 may be elevated so as to effect the dumping of the load. The lower longitudinal edges of the runners 5 are preferably provided with seating recesses 28 for the reception of removable tread pieces 29, the latter being secured to the runners by bolts or similar fastening devices 30 so that when the tread pieces become worn, the same may be readily removed and replaced by new tread pieces by merely removing the fastening devices 30.

Thus it will be seen that as the device is drawn over the surface of a field or other inclosure, the teeth or tines 14 of the gathering device, will collect the stones and other foreign matter, which latter are deposited within the receptacle by tilting the lever 18 in the manner before stated. After the receptacle is loaded, the dumping thereof may be effected by removing the end gate 9 and tilting the long end of the lever 26, which causes the stones to be discharged at the rear end of the receptacle.

It will here be noted that by means of the spacing members 15, the teeth or tines, constituting the gathering device, may be arranged at any desired interval on the oscillating shaft 13.

As a means for regulating the projection of the teeth into the soil, there is provided a longitudinal bar 31 slidably mounted in suitable keepers 32 secured to the exterior face of one of the runners 5 and provided with an angularly disposed finger 33 which bears against the teeth 14 so as to support said teeth at any angle or inclination with respect to the front of the stone receiver.

Suitable clamping screws 34 are threaded on the keepers and adapted to enter openings 35 in the bar 31 for holding said bar in adjusted position.

It will of course be understood that the teeth regulating bars 31 may be secured to the inner or outer faces of either or both runners and that in some cases, the stone receiving receptacle may be mounted on suitable wheels instead of on runners, without departing from the spirit of the invention.

Having thus described the invention, what is claimed as new is:

1. A stone gatherer including spaced runners having means for attachment to a draft device, a shaft journaled on the runners, teeth depending from the shaft and constituting a gathering device, spacing members interposed between the teeth, an operating lever secured to one end of the shaft, a movable bottom interposed between the runners and having one end thereof curved upwardly, a standard, and a lever pivotally mounted on the standard and operatively connected with the curved end of the bottom for tilting the latter to effect the dumping of the load.

2. A stone gatherer including spaced runners, a plate interposed between the runners and constituting a movable bottom, a shaft journaled on the runners, teeth depending from the shaft and constituting a gathering device, a removable screen secured to the teeth, a lever for oscillating the shaft to transfer the stones from the gathering device to the movable bottom, and means operatively connected with one end of said movable bottom for tilting the latter to effect the dumping of the load.

3. A stone gatherer including spaced runners having their lower longitudinal edges provided with seating recesses and their inner faces formed with guiding grooves, detachable tread pieces seated in said recesses, an end gate seated in the grooves, a shaft journaled on the runners at the front of the gatherer, teeth depending from the shaft and having their free ends curved in the direction of the draft device, tubular spacing members interposed between the teeth, a lever secured to one end of the shaft, a standard secured to one of the runners, a plate interposed between the runners and having its front end curved upwardly, said plate constituting a movable bottom, a lever pivotally mounted on the standard, and a flexible connection between the short end of the lever and the curved end of the plate for tilting the latter to effect the dumping of the load.

4. A stone gatherer including a receptacle having a movable bottom, a plurality of teeth pivotally mounted on one end of the receptacle and constituting a gathering device, and means mounted on the receptacle and adapted to engage the teeth below their pivotal axes for regulating the projection of said teeth into the soil.

5. A stone gatherer including a receptacle, a shaft journaled on one end of the receptacle and provided with depending teeth constituting a gathering device, keepers secured to one side of said receptacle, and a bar slidably mounted in said keepers and provided with an angularly disposed finger adapted to engage the teeth for regulating the projection thereof into the soil.

6. A stone gatherer including a receptacle having a movable bottom, a shaft journaled on one end of the receptacle and provided with depending teeth constituting a gathering device, a lever secured to one end of the shaft for elevating the teeth to discharge the stones into said receptacle, means operatively connected with the bottom for elevating the latter to effect the dumping of the load, and means slidably mounted on the receptacle and bearing against the teeth for regulating the projection of said teeth into the soil.

7. A stone gatherer including a receptacle, a gathering device pivotally mounted on one end of the receptacle, and means carried by the receptacle and adapted to engage the gathering device below the pivotal axis thereof for regulating the projection of the free end of said gathering device into the soil.

In testimony whereof, I affix my signature in presence of two witnesses.

ERNST LUDWIG KLOSS. [L. S.]

Witnesses:
   William G. Kloss,
   George W. Seddon.